UNITED STATES PATENT OFFICE.

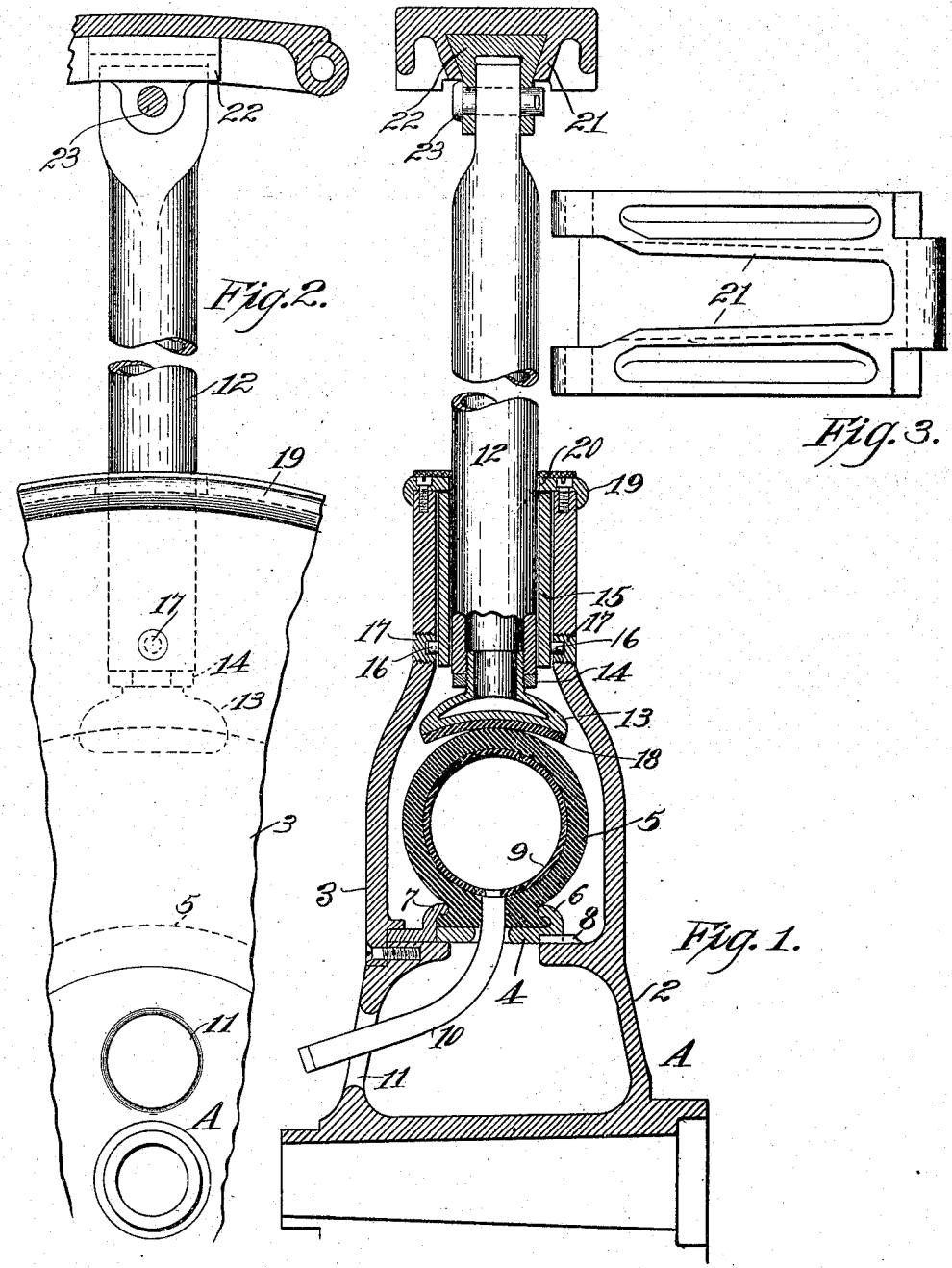

JAMES A. POMEROY, OF PALO ALTO, CALIFORNIA.

VEHICLE-WHEEL.

No. 847,817.　　　　Specification of Letters Patent.　　　Patented March 19, 1907.

Application filed June 7, 1906. Serial No. 320,604.

*To all whom it may concern:*

Be it known that I, JAMES A. POMEROY, a citizen of the United States, residing at Palo Alto, in the county of Santa Clara and State of California, have invented new and useful Improvements in Vehicle-Wheels, of which the following is a specification.

My invention relates to vehicle-wheels. Its a chief object is to provide a practical durable substitute for the expensive pneumatic tires on automobiles.

It consists of the parts and the construction and combination of parts, as hereinafter more fully described and claimed, having reference to the accompanying drawings, in which—

Figure 1 is a sectional view through the hub and spoke. Fig. 2 is a side view of same. Fig. 3 is a detail of a rim-link.

A represents a hub of appropriate construction and provided with an integral annular rear back plate 2 and a removable front plate 3. A sleeve 4 is adapted to be slipped onto the hub before the front plate is secured in place and is provided with suitable means for holding the rubber tube 5 in place. As shown, this sleeve has a fixed annular flange 6 on one end and a removable clamping-ring 7, the tire being of the usual clencher variety and the means for holding the tire in position being such as is appropriate for tires of this class.

Any suitable means may be provided to keep the ring or sleeve 4 from turning on the hub—as, for instance, the fixed lugs 8, which engage corresponding recesses on the ring 4.

The tube 5 incases the usual inner tube 9, which has a nipple portion 10 extending radially through the ring and passing outward through a suitable opening 11 in the hub to permit the attachment of the usual inflating device. The spokes 12, which support the wheel-rim from the hub, are of special construction and are adapted each to be seated on the inflated tube 5 and to be independently operatable to absorb shock in the desired manner. Each spoke preferably consists of a metal tube having a suitable concaved foot-piece 13 secured to its inner end and locked in permanent position by a nut 14. The spoke is permitted a limited lengthwise-sliding movement in a cylinder 15, which is preferably mounted on trunnions 16 in respective front and back plates 2 3. If desired, these trunnions may operate in movable bushings 17, and the surface of the foot-pieces 13 where they contact with the rubber casing 5 may be covered with rubber or canvas, felt, or other suitable material, as shown at 18, for the purpose of preventing undue wear on the casing 5. The outer edges of the plates 2 3 are braced and supported by an annular bridge-plate 19, which has suitable elongated slots 20 for the spokes to work through.

If desired, a continuous strip or flap of rubber or other suitable flexible dust-proof material may be placed around the ring 19 and suitably perforated, so that the spokes will have a snug sliding fit therein for the purpose of excluding dust from between the plates 2 3. In conjunction with this spring-hub I employ an outer rim or tire of special construction. This tire consists of a series of conjoined links, each link of suitable proportions and so connected to the spokes as to permit portions of the tire to give a desired amount on striking an obstacle, and so transmit the shock in the most beneficial manner to the pneumatic-cushion devices contained in the hub, where the shock is finally absorbed. As shown, these links have each a tread portion of sufficient width, with each link having a pair of convergently-arranged lengthwise-extending flange 21 on their side toward the hub.

A dovetailed block 22 is adapted to have a snug driving fit between each pair of flanges 21, and this wedge member 22 is pivoted, as at 23, to a corresponding spoke 12.

As the portion of the tire beneath each spoke encounters a rock or obstruction the immediate adjacent links will give slightly in riding over the obstruction, while the impact of the tire with the obstruction will cause a certain lengthwise movement of one or more of the spokes in the respective cylinders 15, and the cylinders will rock slightly on their trunnions 16 to accommodate the spokes to the various movements incident to travel along the roadway.

Having thus described my invention, what I claim, and desire to secure by Letters Patent, is—

1. In a vehicle-wheel, a hub having front and rear annular plates, an inflatable tube surrounding the hub and housed between said plates, pivotally-mounted cylinder portions supported by the plates, spokes sliding in the cylinders bearing on said inflatable tube, and a rim with which said spokes connect.

2. In a vehicle-wheel, a hub provided with front and rear annular plates, an annular inflatable tube surrounding the hub and housed between said plates, cylinders, trunnions between the plates, spokes slidable in the cylinders having their inner ends bearing on said inflatable tube, and a rim connected with the spokes.

3. In a vehicle-wheel, a hub provided with front and rear annular plates, an annular inflatable tube surrounding the hub and housed between said plates, cylinders, trunnions between the plates, spokes slidable in the cylinders having their inner ends bearing on said inflatable tube, and a rim connected with the spokes, said rim comprising a series of conjoined links.

In testimony whereof I have hereunto set my hand in presence of two subscribing witnesses.

JAMES A. POMEROY.

Witnesses:
S. H. NOURSE,
CHARLES H. HARVEY.